United States Patent [19]

Buckler et al.

[11] 3,898,253

[45] Aug. 5, 1975

[54] REMOLDABLE HALOBUTYL RUBBERS

[75] Inventors: Ernest Jack Buckler; John Robert Dunn, both of Sarnia, Canada

[73] Assignee: Polysar Limited, Sarnia, Canada

[22] Filed: Sept. 6, 1974

[21] Appl. No.: 503,764

[30] Foreign Application Priority Data
Nov. 8, 1973 Canada.............................. 185358

[52] U.S. Cl. ......... 260/42.47; 260/2.3; 260/32.6 A; 260/42.47
[51] Int. Cl.. C08d 13/38; C08c 11/44; C08c 11/10
[58] Field of Search........... 260/32.6 A, 85.3 H, 2.3, 260/42, 47

[56] References Cited
UNITED STATES PATENTS
2,995,545   8/1961   Cottle et al.................... 260/85.3 H
3,084,142   4/1963   Cottle et al..................... 260/85.3 H
3,779,979   12/1973   Tsuchiya....................... 260/85.3 H

OTHER PUBLICATIONS

Alliger et al., Vulcanization of Elastomers (Reinhold) (New York) (1964), pages 255–256, TS 1925. A4.
Morton, Rubber Technology, (2nd ed.) (Van Nostrand) (New York) (July 12, 1973), pages 267–268, TS 1890. M66R.

*Primary Examiner*—Donald E. Czaja
*Assistant Examiner*—H. H. Fletcher
*Attorney, Agent, or Firm*—Stevens, Davis, Miller & Mosher

[57] ABSTRACT

Halobutyl rubber compositions which are rubbery and elastic at room temperatures but which can be softened and remolded on shearing and/or heating comprise the reaction product of a halobutyl copolymer and a tertiary amine.

12 Claims, No Drawings

REMOLDABLE HALOBUTYL RUBBERS

This invention relates to synthetic rubbers, and more particularly to synthetic rubbers having both rubbery and thermoplastic characteristics.

Conventional rubbers, both natural and synthetic, suffer from the disadvantage that in order to develop their desirable elastomeric properties to the full, they need to be crosslinked, i.e., by curing or vulcanization, as a result of which the rubber compounds lose their reprocessable nature. Thus in making good from rubber, an uncured (green) rubber compound, containing the necessary curing reagents, is formed into the desired shape, e.g., by molding or extruding, and then heated to cure it. A cured elastomeric article is thus formed. However, the cured elastomer, as a result of the curing, is not remoldable. Scraps of cured rubber compound which are inevitably formed in manufacturing operations are of little value, because they are not remoldable. They find some applications as fillers when mixed in small proportions with other compounding ingredients, but they cannot be freely mixed with uncured rubber compounds and remolded, as with thermoplastic materials.

Butyl rubber nd halobutyl rubber are examples of types of synthetic rubbers which require curing. Butyl rubber is a copolymer of isobutylene with about 0.1 – 15wt. %, preferably 0.3 – 5 wt.%, most preferably 0.5 – 3 wt.% of a conjugated diolefin, normally isoprene. Halobutyl rubber is prepared by treating butyl rubber with a halogen (bromine or chlorine) or a source of halogen to incorporate about 0.5 – 15 wt. %, preferably 1 – 7.5 wt.% and most preferably 1 – 3 wt.% halogen in the rubber. The isoprene in both butyl and halobutyl rubber provides sites of unsaturation which react with the curing agents to form crosslinks on curing, and the halogen in halobutyl additionally is a site for forming crosslinks on curing. Butyl and halobutyl rubbers are chemically inert and resistant, and have good heat aging characteristics and air impermeability. They are used in tire inner tubes, liners for tubeless tires, cable insulation, sealants, roofing membranes and the like.

The present invention provides a remoldable butyl-type synthetic rubber composition which can be used in applications requiring elastomeric properties, the composition not being crosslinked with the conventional materials and being remoldable and reprocessable.

The rubber compositions of the present invention comprise a halobutyl rubber, i.e., a copolymer of isobutylene with 0.1–15 wt.%, preferably 0.3–5wt.% isoprene and containing from 0.5–15wt.%, preferably 1–7.5wt.% bromine or chlorine, reacted with a suitable amine compound as hereinafter defined, optionally in admixture with an unreactive finely divided filler, e.g. silica, talc, or calcium carbonate.

The suitable amine compounds which are useful in the present invention are limited to those which will react with the halobutyl to yield crosslinked compositions having satisfactory strength properties and which are remoldable. Thus, amine compounds containing primary and secondary amine groups are excluded because, although they will react with halobutyl, they do not yield crosslinked compositions which are remoldable. Suitable amine compounds are selected from tertiary amines in which the organo group is aliphatic or aromatic and from N-alkyl piperidine and the N-alkyl piperazines. Other heterocyclic nitrogen compounds are excluded from suitable amine compounds.

Suitable amine compounds are selected from A. compounds of structure

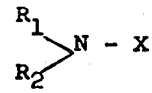

where $R_1$ and $R_2$ are methyl or ethyl groups and where X is one of
   a. an alkyl group having five to 30 carbon atoms;
   b. a $C_1$ or $C_2$ alkyl group substituted with benzene or a substituted benzene;
   c. an alkyl group having four to 30 carbon atoms and having attached thereto at least one other

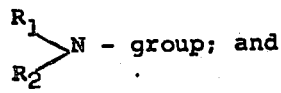

d. a nitrogen - carbon containing group having alkyl groups connected by single nitrogen atoms and containing at least one other

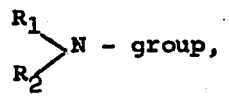

having from four to 10 carbon atoms in said alkyl groups and from one to four nitrogen atoms connecting said alkyl groups:
   B. piperidine or piperazine substituted with a methyl or ethyl group at the heterocyclic nitrogen atoms; and
   C. tri-ethylene diamine.

Examples of suitable amine compounds include N,N-dimethyl hexylamine, N,N- dimethyl dodecylamine, N,N- dimethyl octadecylamine, N,N- dimethyl benzylamine, N,N,N',N'-tetramethyl hexamethylene diamine, N,N,N',N'',N''',N'''-hexamethyl triethylene tetramine, N,N,N',N'-tetramethyl tetraethylene pentamine, N-methyl piperidine, N-methyl piperazine, N,N'-dimethyl piperazine and tri-ethylene diamine or mixtures thereof.

Whilst it is not intended that the invention should be interpreted as limited to any particular theory of operation, it is believed that the amine reacts with the bromine or chlorine of the halobutyl to form labile crosslinks between the polymer chains. Such crosslinks are stable in the absence of shear and up to a temperature in the range of 50° – 75°C. Thus, up to about 50°C, the rubber compounds of this invention have the elastomeric properties normally associated with cured crosslinked halobutyl rubbers. Under the influence of shear, and preferably slightly elevated temperatures, the compositions of this invention become reprocessable. When heated to about 100°C to 200°C these compositions can be remolded and re-shaped, as for thermoplastics, in spite of having been crosslinked. When cooled to below about 50°C, preferably to room temperature, the compositions recover their elastomeric properties.

The amount of amine which is used is arranged so that at least 20% of the bromine or chlorine groups on the halobutyl polymer are utilised in forming the labile crosslinks. Thus, preferably one uses a quantity of amine which contains an amount of reactable amine groups equivalent to at least 50% of the amount of bromine or chlorine groups in the polymer. With a di-tertiary amine, one preferably uses at least 1 mole of the amine compound per 2 moles of halogen. The more labile crosslinks which are formed, the greater the strength of the rubber composition. A stoichiometric amount of amine, i.e., sufficient amine to react with all the halide present, is therefore the most preferred. Less than a stoichiometric amount of amine, down to a minimum of at least 20% of the stoichiometric amount, can be used, but with some loss of strength properties. Excess amounts of amine can be used, without technical disadvantages, up to about five times the stoichiometric amount. In some compositions of the invention, small excesses are desirable, since it appears some allowance has to be made for absorption of the amine by the filler in the composition. In terms of weight percentages, a bromobutyl rubber containing about 1.5 weight per cent bromine should be reacted with about 1.6 parts by weight of N,N,N',N'-tetramethylhexamethylenediamine, per 100 parts by weight rubber, for stoichiometric amount. The same bromobutyl rubber should be reacted with about 4 phr of N, N-dimethyldodecylamine.

The compositions of the present invention optionally also contain fillers, the presence of such fillers causing an increase in strength of the crosslinked compositions. The fillers are generally fine particle size inorganic materials of the type generally used in rubber compounding, but excluding those which react directly with the chosen amine cross-linking reagent or with the halobutyl rubber to form permanent crosslinks. Preferred fillers are unreactive, finely divided silicas, talc and calcium carbonate. Carbon blacks generally are not suitable. The amounts of filler which are used normally can vary between fairly wide limits, from about 20 to about 150 parts by weight filler, preferably from about 30 to about 100 parts by weight filler, per hundred parts of rubber (phr).

The method of preparing the compositions of the present invention is not critical, provided that when a filler is used, an intimate dispersion of the filler in rubber is obtained, and adequate facility is provided for reaction between the halobutyl and the amine to take place. One method is to use a rubber mixing mill, and first feed the halobutyl rubber thereto, the mill being warm, e.g., 45°C. The halobutyl preferably contains a small amount of antioxidant, in the conventional way, for protection purposes. As soon as the halobutyl has formed a band on the mill rolls, the filler is added gradually. When all the filler has been added, the mill and halobutyl/filler mixture are cooled, then the amine is added and mixed in, following which the compound is sheeted off the mill. The composition is then allowed to react to develop the necessary strength. This is achieved by heating the composition at a suitable temperature for the time necessary for adequate reaction. Suitable temperatures are from about 50°C to about 200°C for times of from about 1 minute to about 24 hours. Preferred conditions are temperatures of 75°C to 175°C for 5 minutes to 8 hours. A suitable cross-linked composition is thereby formed as a remoldable butyl-type synthetic rubber composition of good strength properties, which may be remolded or reshaped. Molding or shaping of the composition may be achieved during the heating stage for generation of the crosslinks by virtue of heating the composition in the desired shape. Alternatively, the crosslinked composition may be molded or shaped as a separate step subsequent to the crosslinking When the crosslinked composition is molded or re-molded subsequent to the crosslinking step, such molding is achieved by heating the composition to temperatures of about 100°C to about 200°C and molding under sufficient pressure to ensure good flow into the mold. The shearing action due to the applied pressure and the elevated temperature cause the labile crosslinks to be broken. When cooled to below 50°C, preferably to room temperature, the crosslinked composition, which has a substantially smooth surface, becomes an elastomer having good strength properties. The actual strength properties are determined by the extent of crosslinking achieved and by the presence or absence of fillers. One skilled in the art can readily determine what level of crosslinking and what amount of filler is necessary for the desired strength properties.

The compositions can be used in rubber applications similar to those in which normal cured butyl and halobutyl rubbers are used, but which do not require the composition to retain its shape and strength under dynamic conditions or at elevated temperatures. Examples of such applications are in sealants and adhesives which are applied by hot gunning the compositions, in hoses, bladders, roofing membranes and compositions, reservoir lining sheets and the like.

The invention is further illustrated in the following specific examples.

EXAMPLE 1

Samples of a bromobutyl rubber were compounded and reacted with N,N,N',N'-tetramethylhexamethylenediamine (MHDMA) alone or mixed with dimethyldodecylamine, and the resulting compositions tested for both rubbery and reprocessable properties.

The bromobutyl sample was of high molecular weight, having a Mooney (ML1 + 12 at 257°F) of 53, and had a bromine content of 1.9 weight percent. The rubber containing about 0.1 weight percent antioxidant was mixed on a warmed (45°C) mill, and when it had formed a band, silica filler was added gradually. Then the mill was cooled, and to the cooled compound on the mill was added the desired amount of the selected amine or mixture of amines. Then the compounds were sheeted off the mill.

The compounds were heated in a mold at 175°C for 5 minute to allow the amine to react fully with the rubber. A sample of each crosslinked composition, after cooling, was tested for initial physical properties. Other samples were subjected to a hot milling procedure, at about 175°C on a rubber mill. It was found that continuous bands were formed on the mill, indicating the reprocessable nature of the crosslinked compositions after reaction with the amine. The compositions were sheeted off and cooled. A sample of the sheeted off composition was put into a mold under pressure and at 175°C for 5 minutes and pressed into a sheet, to obtain a hot remilled sample, which was subsequently tested for physical properties.

The compounds and results are given in Table 1.

TABLE I

| Compound Reference | | 730108/1 | 730108/2 | 730108/3 | 730108/4 |
|---|---|---|---|---|---|
| Bromobutyl(parts by wt.) | | 200 | 200 | 200 | 200 |
| Hisil 233*silica(parts by wt.) | | 111 | — | 55.5 | 55.5 |
| Silene EF*silica(parts by wt.) | | — | 116.6 | — | — |
| Silene D*silica(parts by wt.) | | — | — | 53.5 | 53.5 |
| MHDMA (parts by wt.) | | 3 | 3 | 3 | 3 |
| Dimethyldodecylamine(parts by wt.) | | | | 3.8 | |
| Initial physical properties | Tensile(Kg/cm$^2$) | 77 | 94 | 70 | 128 |
| | Elongation (%) | 560 | 730 | 760 | 880 |
| | 300% modulus (Kg/cm$^2$) | 40 | 31 | 25 | 26 |
| Physical properties after hot remilling. | Tensile(Kg/cm$^2$) | 60 | 38 | 54 | 45 |
| | Elongation (%) | 440 | 600 | 700 | 830 |
| | 300% modulus (Kg/cm$^2$) | 43 | 15 | 19 | 11 |

*Trademarks

The results in Table I show that the compositions of the invention have suitable strength properties and can be re-molded while retaining satisfactory strength properties.

EXAMPLE 2

In this example, a chlorobutyl rubber having a chlorine content of 1.1 weight percent, was reacted with MHDMA. Silica filler was used. The crosslinked composition was prepared, tested and treated as described in Example 1. The results are shown in Table 2. Generally smooth sheets were obtained from the compounds on hot remilling.

EXAMPLE 3

A sample of the bromobutyl of Example 1 was compounded with sodium silico-aluminate (Zeolex 23) 58.25 parts by weight per 100 parts by weight of bromobutyl, 1 part per 100 parts of bromobutyl of an antioxidant (Antioxidant 2246) and varying levels of dimethyldodecylamine. The same procedure as in Example 1 was used. The compounds were crosslinked by heating for 5 minutes at 175°C. Samples of the crosslinked composition were re-milled on a mill at 175°C, forming a smooth band, following which they were re-molded by heating for 5 minutes at 175°C in a mold. The physical properties are recorded in Table 3.

From these results, it is clear that the first crosslinked composition which contains 0.5g of dimethyldodecylamine per 100g of bromobutyl (i.e., 0.1 mole of amine per mole of bromine in the bromobutyl) has only poor strength properties.

TABLE 2

| Compound Reference | | 730119/1 | EM73043/1 | EM73043/3 | EM73043/4 | EM73043/5 |
|---|---|---|---|---|---|---|
| Chlorobutyl (parts by wt.) | | 200 | 100 | 100 | 100 | 100 |
| Antioxidant 2246 (parts by wt.) | | | 1 | 1 | 1 | 1 |
| Hisil 233 silica (parts by wt.) | | 111 | 27.75 | 27.75 | 27.75 | 27.75 |
| Silene D silica (parts by wt.) | | | 26.75 | 26.75 | 26.75 | 26.75 |
| MHDMA (parts by wt.) | | 3 | — | 1.5 | 2.25 | 3.0 |
| Dimethyldodecylamine (parts by wt.) | | | 1.9 | — | — | — |
| Initial Physical properties | Tensile (Kg/cm$^2$) | 56 | 33 | 40 | 32 | 38 |
| | Elongation (%) | 470 | 1020 | 1060 | 1070 | 1190 |
| | 300%Modulus(Kg/cm$^2$) | 44 | 11 | 12 | 8 | 8 |
| Physical properties after hot remilling. | Tensile (Kg/cm$^2$) | 54 | 33 | 44 | 46 | |
| | Elongation (%) | 430 | 710 | 790 | 1010 | 880 |
| | 300%Modulus (Kg/cm$^2$) | 36 | 16 | 12 | 12 | 18 |

TABLE 3

| Polymer Identification EM-730913 | | 1 | 2 | 3 | 4 | 5 | 6 |
|---|---|---|---|---|---|---|---|
| Dimethyldodecylamine (parts by weight) | | 0.5 | 2.5 | 3.75 | 5.0 | 7.5 | 10.0 |
| Crosslinked Composition Properties | | | | | | | |
| Tensile strength (Kg/cm$^2$) | Original | 24 | 57 | 71 | 73 | 64 | 90 |
| | remilled | 39 | 35 | 37 | 38 | 32 | 31 |
| Elongation (%) | Original | 990 | 870 | 840 | 800 | 710 | 840 |
| | remilled | 920 | 880 | 700 | 650 | 510 | — |
| 100% Modulus (Kg/cm$^2$) | Original | 7 | 7 | 8 | 9 | 8 | 8 |
| | remilled | 9 | 7 | 10 | 8 | 8 | 8 |
| 300% Modulus (Kg/cm$^2$) | Original | 8 | 14 | 17 | 22 | 20 | 27 |
| | remilled | 16 | 15 | 22 | 21 | 22 | 22 |

EXAMPLE 4

In this example, bromobutyl was compounded with different white fillers, reacted with dimethyldodecylamine, and the resulting crosslinked compositions tested. The procedure was as described in Example 1. The bromobutyl contained 2.1 weight percent bromine.

The results are given in Table 4. In addition, all of the hot remilled samples gave smooth sheets, indicating their reprocessable nature.

TABLE 4

| Compound Reference EM730215 | | 2 | 3 | 4 | 6 | 7 | 10 | 13 | 14 |
|---|---|---|---|---|---|---|---|---|---|
| Bromobutyl (parts by wt.) | | 200 | 200 | 200 | 200 | 200 | 200 | 200 | 200 |
| Hisil 233 Silica (parts by wt.) | | 111 | | | | | | | |
| Hisil EP Silica (parts by wt.) | | | 111 | | | | | | |
| Ultrasil*Silicia (parts by wt.) | | | | 111 | | | | | |
| Zeolex 23, hydrous sodium silico-aluminate (parts by wt.) | | | | | 116.5 | | | | |
| Silene D Silica (parts by wt.) | | | | | | 107 | | | |
| Purecal-U*calcium carbonate (parts by wt.) | | | | | | | 147 | | |
| Mistron vapour*magnesium silicate(parts by wt.) | | | | | | | | 133 | |
| Cabosil*silica (parts by wt.) | | | | | | | | | 61 |
| Dimethyldodecylamine (parts by wt.) | | 3.8 | 3.8 | 3.8 | 3.8 | 3.8 | 3.8 | 3.8 | 3.8 |
| Initial Physical Properties | Tensile (kg/cm$^2$) | 70 | 69 | 61 | 82 | 77 | 69 | 52 | 51 |
| | Elongation (%) | 800 | 800 | 550 | 880 | 1060 | 1240 | 1000 | 1100 |
| | 300%Modulus (Kg/cm$^2$) | 23 | 16 | 27 | 20 | 13 | 6 | 13 | 13 |
| Physical Properties After Hot Remilling | Tensile (Kg/gm$^2$) | 45 | 24 | 46 | 59 | 49 | 74 | 25 | 31 |
| | Elongation (%) | 580 | 1100 | 600 | 600 | 1050 | 1200 | 1100 | 1200 |
| | 300%Modulus (Kg/cm$^2$) | 20 | 6 | 22 | 27 | 9 | 4 | 10 | 6 |

*Trademarks

EXAMPLE 5

100 parts by weight of the bromobutyl of Example 1 was mixed, using the procedure of Example 1, with 58.25 parts by weight of Zeolex 23, 1 part by weight of Antioxidant 2246 and 5 parts by weight of dimethyldodecylamine. The compound was divided into parts and each part placed in a mold at 75°C, at 100°C or at 125°C for the times shown in Table 5. On cooling to room temperature, the crosslinked compositions were tested for strength properties with the results shown in the Table.

It is clear that temperatures as low as 75°C caused crosslinking of the amine compound and the bromobutyl.

TABLE 5

| Crosslinking Temperature (°C) | 75°C | | | 100°C | | | 125°C | | |
|---|---|---|---|---|---|---|---|---|---|
| Crosslinking Time (hours) | 2 | 6 | 16 | 1 | 3 | 8 | 0.5 | 1.5 | 4 |
| Crosslinked Composition Properties | | | | | | | | | |
| Tensile Strength (Kg/cm$^2$) | 104 | 118 | 136 | 125 | 121 | 120 | 128 | 123 | 122 |
| Elongation (%) | 780 | 720 | 710 | 760 | 830 | 830 | 870 | 840 | 870 |
| 100% Modulus (Kg/cm$^2$) | 8 | 12 | 14 | 10 | 12 | 11 | 10 | 10 | 8 |
| 300% Modulus (Kg/cm$^2$) | 26 | 41 | 50 | 40 | 40 | 34 | 36 | 28 | 26 |

What is claimed is:

1. A remoldable halobutyl rubber composition comprising the reaction product of
   I. a copolymer of isobutylene with about 0.1-15 wt. % isoprene and containing 0.5-15 wt. % bromine or chlorine, and
   II. at least one tertiary amine compound selected from
   A. compounds of structure

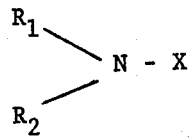

where $R_1$ and $R_2$ are methyl or ethyl groups and where X is one of
   a. an alkyl group having five to 30 carbon atoms;
   b. a $C_1$ or $C_2$ alkyl group substituted with benzene or a substituted benzene;
   c. an alkyl group having four to 30 carbon atoms and having attached thereto at least one other

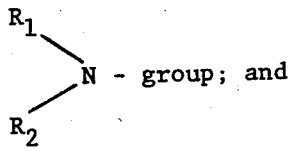

d. a nitrogen-carbon containing group having alkyl groups connected by single nitrogen atoms and containing at least one other

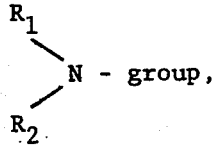

having from four to 10 carbon atoms in said alkyl groups and from one to four nitrogen atoms connecting said alkyl groups;

B. piperidine or piperazine substituted with a methyl or ethyl group at the heterocyclic nitrogen atoms; and C. Tri-ethylene diamine, wherein the amount of tertiary amine contains reactable amine groups equivalent to from 1/5 to 5 times the amount of bromine or chlorine groups in the copolymer.

2. The composition of claim 1 wherein the copolymer is a copolymer of isobutylene with 0.3–5 wt. % isoprene.

3. The composition of claim 2 wherein the copolymer contains from 1 to 7.5 wt. % bromine or chlorine.

4. The composition of claim 3 in admixture with an unreactive finely filler selected from silica, talc or calcium carbonate in an amount of from about 20 to about 150 parts by weight per 100 parts by weight of copolymer.

5. The composition of claim 1 wherein the tertiary amine is selected from N,N-dimethyl hexylamine, N,N-dimethyl dodecylamine, N,N-dimethyl octadecylamine, N,N-dimethyl benzylamine, N,N,N',N'-tetramethyl hexamethylene diamine, N,N,N',N'',N''',-N'''-hexamethyl triethylene tetramine, N,N,N',N'-tetramethyl tetraethylene pentamine, N-methyl piperidine, N-methyl piperazine, N,N'-dimethyl piperazine, triethylene diamine and mixtures thereof.

6. The composition of claim 5 wherein the tertiary amine is N,N,N',N'-tetramethyl hexamethylene diamine.

7. The composition of claim 5 wherein the tertiary amine is N,N-dimethyl dodecylamine.

8. A process for preparing remoldable halobutyl rubber compositions which comprises reacting I. a copolymer of isobutylene with about 0.1–15 wt. % isoprene and containing 0.5–15 wt. % bromine or chlorine, with II. a tertiary amine selected from
A. compounds of structure

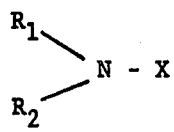

where $R_1$ and $R_2$ are methyl or ethyl groups and where X is one of a. an alkyl group having five to 30 carbon atoms;
b. a $C_1$ or $C_2$ alkyl group substituted with benzene or a substituted benzene;
c. an alkyl group having four to 30 carbon atoms and having attached thereto at least one other

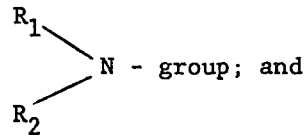

d. a nitrogen-carbon containing group having alkyl groups connected by single nitrogen atoms and containing at least one other

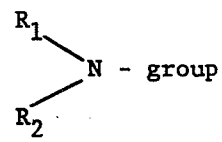

having from four to 10 carbon atoms in said alkyl groups and from 1 to 4 nitrogen atoms connecting said alkyl groups;

B. piperidine or piperazine substituted with a methyl or ethyl group at the heterocyclic nitrogen atoms; and C. tri-ethylene diamine, wherein the amount of tertiary amine reacted with the copolymer contains reactable amine groups equivalent to from 1/5 to 5 times the amount of bromine or chlorine groups in the copolymer, the reaction being at a temperature of about 50°C to about 200°C for a time of from about 1 minute to about 24 hours.

9. The process of claim 8 wherein said heating is at temperatures of from 75° – 175°C, for a time of from 5 minutes to 8 hours.

10. The process of claim 8 which also contains the step of adding to the rubber composition non-reactive finely divided filler selected from silica, talc or calcium carbonate in an amount of from about 20 to about 150 parts by weight per 100 parts by weight of copolymer.

11. The process of claim 8 in which the rubber composition is remolded and reshaped by heating to a temperature of about 100° to 200°C followed by cooling to below about 50°C.

12. The process of claim 10 wherein the reaction takes place by adding said filler to said copolymer and forming an intimate mixture thereof, then mixing in the tertiary amine and then heating the mixture to a temperature of about 75° to 175°C for a time of from about 5 minutes to 8 hours.

* * * * *